United States Patent
Fujisawa et al.

(10) Patent No.: US 11,238,284 B2
(45) Date of Patent: Feb. 1, 2022

(54) VEHICLE STATE EVALUATION APPARATUS

(71) Applicant: Honda Motor Co., Ltd., Tokoy (JP)

(72) Inventors: Koki Fujisawa, Tokyo (JP); Satoru Okubo, Tokyo (JP); Hiroki Yokoyama, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 136 days.

(21) Appl. No.: 16/735,087

(22) Filed: Jan. 6, 2020

(65) Prior Publication Data
US 2020/0218893 A1 Jul. 9, 2020

(30) Foreign Application Priority Data
Jan. 8, 2019 (JP) .............................. JP2019-001302

(51) Int. Cl.
| G06T 13/40 | (2011.01) |
| G06K 9/00 | (2006.01) |
| G06Q 30/06 | (2012.01) |
| H04N 5/225 | (2006.01) |

(52) U.S. Cl.
CPC ..... G06K 9/00664 (2013.01); G06Q 30/0645 (2013.01); H04N 5/225 (2013.01)

(58) Field of Classification Search
CPC ...... G06N 99/005; G06Q 40/08; G06Q 30/04; G06Q 30/0645; G06Q 10/20; G06Q 30/0283; G06K 9/6215; G06K 9/00624; G06K 9/00671; G06K 9/00771; G06K 9/3258; G05D 1/0234

See application file for complete search history.

(56) References Cited

U.S. PATENT DOCUMENTS

| 2005/0144018 | A9* | 6/2005 | Aptekar | G06Q 30/0645 |
| | | | | 705/307 |
| 2015/0287130 | A1* | 10/2015 | Vercollone | G06K 9/2081 |
| | | | | 705/4 |
| 2020/0137292 | A1* | 4/2020 | Liang | G08C 17/02 |

FOREIGN PATENT DOCUMENTS

JP H11242778 A 9/1999

* cited by examiner

*Primary Examiner* — Phuoc H Doan
(74) *Attorney, Agent, or Firm* — Duft & Bornsen, PC

(57) ABSTRACT

A vehicle state evaluation apparatus includes an electronic control unit having a microprocessor and memory. The microprocessor is configured to perform: acquiring a renting-image of a vehicle photographed by a user of a vehicle-renting-service using a camera mounted on a wireless-terminal at a renting-time of the vehicle and a renting-location-information of a photographing-location of the renting-image, and a returning-image of the vehicle photographed by the user using the camera at a returning-time of the vehicle and a returning-location-information of a photographing-location of the returning-image, from the wireless-terminal; detecting a change-degree of a state of the vehicle from the renting-time to the returning-time based on the renting-image and the returning-image acquired; and determining whether the renting-image and the returning-image are reliable based on the renting-location-information and the returning-location-information acquired, the detecting including detecting the change-degree when it is determined that the renting-image and the returning-image are reliable.

18 Claims, 7 Drawing Sheets

FIG. 4A

|  | CONTAMINATION DEGREE ||  VEHICLE EVALUATION (IMAGES) ||
|---|---|---|---|---|
|  | EXTERNAL FACTOR UNEXCLUDED (%) | EXTERNAL FACTOR EXCLUDED(%) | EXTERNAL FACTOR UNEXCLUDED (%) | EXTERNAL FACTOR EXCLUDED(%) |
| VEHICLE 1A | 10 | 7 | GOOD | GOOD |
| VEHICLE 1B | 25 | 17 | SOMEWHAT GOOD | SOMEWHAT GOOD |
| VEHICLE 1C | 40 | 28 | SOMEWHAT BAD | SOMEWHAT GOOD |
| VEHICLE 1D | 70 | 49 | BAD | SOMEWHAT BAD |
| VEHICLE 1E | 90 | 63 | BAD | BAD |

FIG. 4B

| CONTAMINATION DEGREE(%) | EVALUATION |
|---|---|
| 0~10 | GOOD |
| 11~30 | SOMEWHAT GOOD |
| 31~50 | SOMEWHAT BAD |
| 51~100 | BAD |

*FIG. 5*

|  | VEHICLE EVALUATION (IMAGES) | USER EVALUATION | THIRD PARTY EVALUATION | RELIABILITY |
|---|---|---|---|---|
| VEHICLE 1A | GOOD | GOOD | GOOD | GOOD |
| VEHICLE 1B | SOMEWHAT GOOD | GOOD | SOMEWHAT GOOD | SOMEWHAT GOOD |
| VEHICLE 1C | SOMEWHAT GOOD | SOMEWHAT BAD | SOMEWHAT GOOD | SOMEWHAT GOOD |
| VEHICLE 1D | SOMEWHAT BAD | GOOD | BAD | BAD |
| VEHICLE 1E | BAD | BAD | BAD | SOMEWHAT BAD |

VEHICLE STATE EVALUATION APPARATUS

CROSS-REFERENCE TO RELATED APPLICATION

This application is based upon and claims the benefit of priority from Japanese Patent Application No. 2019-001302 filed on Jan. 8, 2019, the content of which is incorporated herein by reference.

BACKGROUND OF THE INVENTION

Field of the Invention

This invention relates to a vehicle state evaluation apparatus configured to evaluate a state of a vehicle after use by a user of a vehicle renting service.

Description of the Related Art

Recently, vehicle renting service has been widely used that allows a user to rent a vehicle (shared vehicle) without human intervention using a previously registered IC card or the like and to be charged in accordance with the use time or use distance (travel distance) of the vehicle when returning the vehicle. In such vehicle renting service, the user may damage or dirty the vehicle while using the rented vehicle. In this case, the user may not report the damage on the vehicle or may report the damage on the vehicle as if the degree of damage were lower than the actual degree.

To address this problem, for example, Japanese Unexamined Patent Application Publication No. Hei 11-242778 (JPH11-242778A) describes an apparatus that is able to grasp the state of the vehicle, such as damage on the vehicle caused by collision or the remaining amount of fuel.

However, the apparatus of JPH11-242778A is unable to detect minor damage, such as a scratch, dirt, or the like and thus to accurately evaluate the state of the vehicle that the user has used unless the user accurately reports damage or the like.

SUMMARY OF THE INVENTION

An aspect of the present invention is a vehicle state evaluation apparatus including an electronic control unit having a microprocessor and a memory connected to the microprocessor. The microprocessor is configured to perform: acquiring a renting image of a vehicle photographed by a user of a vehicle renting service using a camera mounted on a wireless terminal at a renting time of the vehicle and a renting location information of a photographing location of the renting image, and a returning image of the vehicle photographed by the user using the camera at a returning time of the vehicle and a returning location information of a photographing location of the returning image, from the wireless terminal; detecting a change degree of a state of the vehicle from the renting time to the returning time based on the renting image and the returning image acquired; and determining whether the renting image and the returning image are reliable based on the renting location information and the returning location information acquired, and the microprocessor is configured to perform the detecting including detecting the change degree when it is determined that the renting image and the returning image are reliable.

Another aspect of the present invention is a vehicle state evaluation apparatus, including an electronic control unit having a microprocessor and a memory connected to the microprocessor, wherein the microprocessor is configured to function as: an information acquisition unit configured to acquire a renting image of a vehicle photographed by a user of a vehicle renting service using a camera mounted on a wireless terminal at a renting time of the vehicle and a renting location information of a photographing location of the renting image, and a returning image of the vehicle photographed by the user using the camera at a returning time of the vehicle and a returning location information of a photographing location of the returning image, from the wireless terminal; a change detection unit configured to detect a change degree of a state of the vehicle from the renting time to the returning time based on the renting image and the returning image acquired by the information acquisition unit; and an image reliability determination unit configured to determine whether the renting image and the returning image are reliable based on the renting location information and the returning location information acquired by the information acquisition unit, and the change detection unit is configured to detect the change degree when it is determined that the renting image and the returning image are reliable by the image reliability determination unit.

Another aspect of the present invention is a vehicle state evaluation method, including: acquiring a renting image of a vehicle photographed by a user of a vehicle renting service using a camera mounted on a wireless terminal at a renting time of the vehicle and a renting location information of a photographing location of the renting image, and a returning image of the vehicle photographed by the user using the camera at a returning time of the vehicle and a returning location information of a photographing location of the returning image, from the wireless terminal; detecting a change degree of a state of the vehicle from the renting time to the returning time based on the renting image and the returning image acquired; and determining whether the renting image and the returning image are reliable based on the renting location information and the returning location information acquired, wherein the detecting includes detecting the change degree when it is determined that the renting image and the returning image are reliable.

BRIEF DESCRIPTION OF THE DRAWINGS

The objects, features, and advantages of the present invention will become clearer from the following description of embodiments in relation to the attached drawings, in which:

FIG. 4A is a diagram showing an example of state evaluations of vehicles based on degrees of dirt detected by a change detection unit the server of FIG. 2;

FIG. 4B is a diagram showing an example of criteria by which the state evaluations of the vehicles shown in FIG. 4A;

FIG. 5 is a diagram showing an example of a user reliability determined by a reliability determination unit of the server of FIG. 2;

DETAILED DESCRIPTION OF THE INVENTION

Hereinafter, an embodiment of the present invention will be described with reference to FIGS. 1 to 6B. A vehicle state evaluation apparatus according to the embodiment of the present invention determines the reliability of images of a vehicle taken by a user of vehicle renting service, such as car sharing, when renting the vehicle (hereafter referred to as "renting images") and images of the vehicle taken by the user when returning it (hereafter referred to as "returning images") on the basis of information indicating the locations in which the renting images and returning images have been taken. If it determines that the renting images and returning images are reliable, the vehicle state evaluation apparatus detects a change in the state of the vehicle between when renting the vehicle and when returning it. Thus, the vehicle state evaluation apparatus is able to accurately evaluate the state of the vehicle that the user has used.

The types of vehicle renting service include car sharing and car rental. In the case of car sharing, a user rents a vehicle (shared vehicle) using a previously registered IC card or the like without human intervention and is automatically charged with a use fee corresponding to the use time or use distance (travel distance) when returning the vehicle. In the case of car rental, a user rents a vehicle through a shop clerk. While the vehicle state evaluation apparatus according to the present embodiment can also be applied to car rental, an example of application thereof to car sharing will be described below.

Figure 1A:
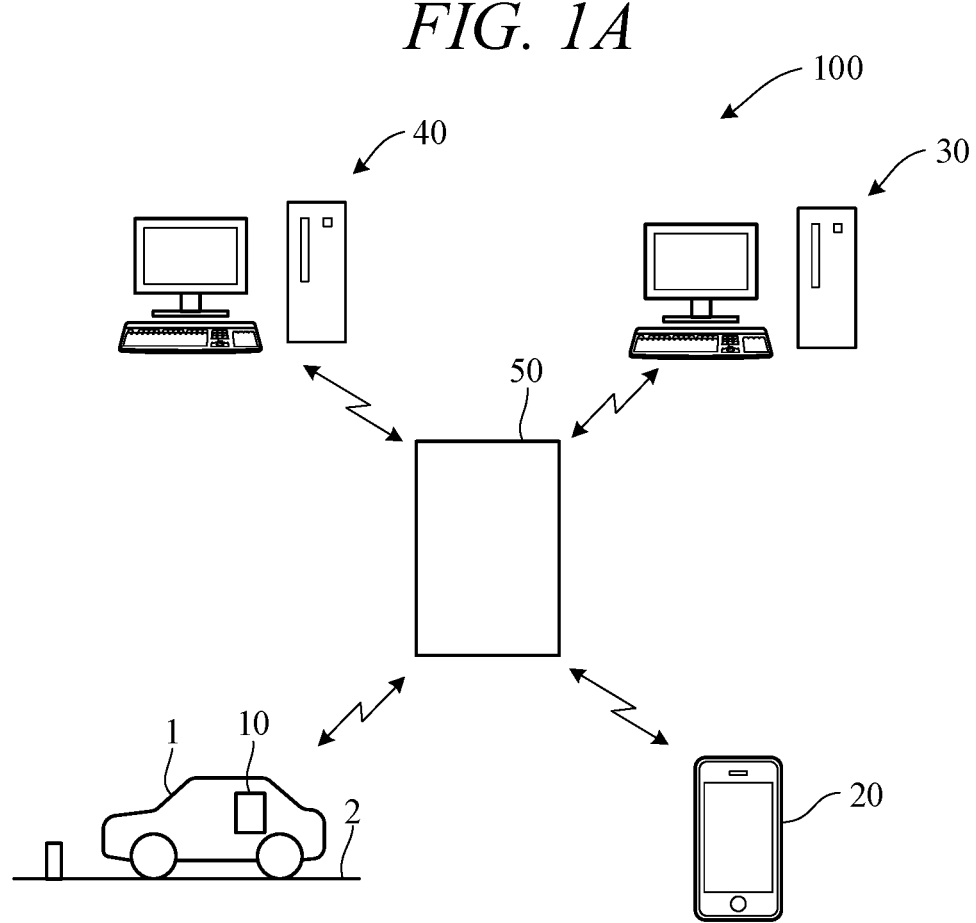
FIG. 1A is a diagram schematically showing overall configuration of a vehicle state evaluation system including a server serving as a vehicle state evaluation apparatus according to an embodiment of the present invention.
Figure 1B:
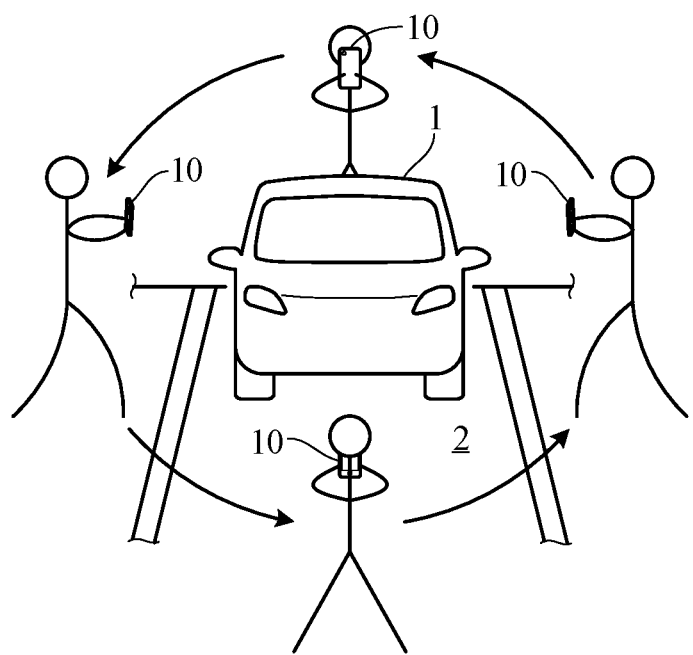
FIG. 1B is a diagram schematically showing a state in which a user is taking images of a vehicle at a station of FIG. 1A.

FIG. 1A is a diagram schematically showing overall configuration of a vehicle state evaluation system 100 including a server 50 serving as the vehicle state evaluation apparatus according to the embodiment of the present invention. FIG. 1B is a diagram schematically showing a state in which a user is taking images of a vehicle 1 at a station 2, which is the predetermined renting and returning location of the vehicle 1. As shown in FIG. 1A, in the vehicle state evaluation system 100, vehicles 1 for car sharing owned by a car sharing service provider include vehicle-mounted terminals 10 that are able to communicate with the server 50.

The vehicles 1 include various types of four-wheel vehicles having different body sizes, cabin capacities, and the like, such as sedans (saloons), SUVs, minivans, and trucks. Providing various types of vehicles 1 increases user options and thus increases the user convenience of car sharing.

Stations 2 are the renting and returning locations of the vehicles 1. For example, one user rents a vehicle at one station 2 and returns it to the same station 2.

Users previously register required information with the car sharing service provider. Terminals used to take images of the vehicles 1 are configured to be able to wirelessly communicate with the server 50. For example, those terminals consist of terminals disposed at the stations 2 or user terminals 20, such as smartphones, of the users themselves.

For renting, a user takes images of a yet-to-be-used vehicle 1 parked at a station 2, which is the renting location. For returning, the user takes images of the used vehicle 1 parked at the station 2, which is the returning location. As shown in FIG. 1B, the user may sequentially take still images of the front, rear, left, and right sides of the vehicle 1, or may take moving images of the vehicle 1 while moving around the vehicle 1 by 360 degrees.

The state of the vehicle 1 is evaluated on the basis of the images taken by the user, and the user reliability is determined on the basis of the state evaluation of the vehicle 1. The user reliability is a user rating and is an index indicating that the user is a user who does not dirty the vehicle 1, shows good manners when using the vehicle 1, and if the user dirties the vehicle 1, honestly makes a report to that effect.

Also, it can be determined whether a cleaning service provider or repair service provider needs to clean or repair the vehicle 1, on the basis of the state evaluation of the vehicle 1. The cleaning service provider and repair service provider are previously registered with the car sharing service provider.

A typical problem associated with vehicle renting service, such as car sharing service, is that a user damages or dirties a rented vehicle 1. With respect to damage on the vehicle 1, the car sharing service provider cannot determine whether the damage has been done to the vehicle 1 during use of the vehicle 1 by the user or during parking of the vehicle 1 at the station 2 after use by the user, unless the user accurately reports the damage. For this reason, even if the damage has been done to the vehicle 1 during use by the user, the car sharing service provider cannot charge the user with a repair fee unless the user reports the damage, that is, has to bear the cost of the damage. As for dirt of the vehicle 1, the vehicle 1 is regularly cleaned for comfortable use of the vehicle 1 by users, as well as cleaned on an ad hoc basis if dirt is pointed out by a user. For this reason, if dirt is pointed out more frequently, the car sharing service provider would have to bear higher cleaning cost.

For this reason, the car sharing service provider hopes that the vehicles 1 will be used by more reliable users, for example, users who show good manners during use of the vehicles 1 and honestly report dirt or damage if made. On the other hand, the users include less reliable users, for example, users who show bad manners during use of the vehicles 1 or users who do not honestly report dirt or damage.

In view of the foregoing, in the present embodiment, a user himself or herself is caused to take images of a vehicle 1 when renting it (before use) (renting images) and take images of the vehicle 1 when returning it (after use) (returning images), and a change in the state of the vehicle 1 between when renting the vehicle 1 and when returning it is detected on the basis of the renting images and returning images taken by the user himself or herself. Also, reliable images including information indicating the locations in which the renting images and returning images have been taken, are used. Thus, the state of the vehicle 1 that the user has used can be accurately evaluated. Evaluating the state of the vehicle 1 that the user has used, on the basis of the images taken by the user himself or herself allows the user to become aware of damage or dirt on the vehicle 1 and to improve his or her manners when using the vehicle 1. To favorably realize the above-mentioned operation, in the present embodiment, the vehicle state evaluation apparatus (server) 50 and the vehicle state evaluation system 100 are configured as follows.

Figure 2:
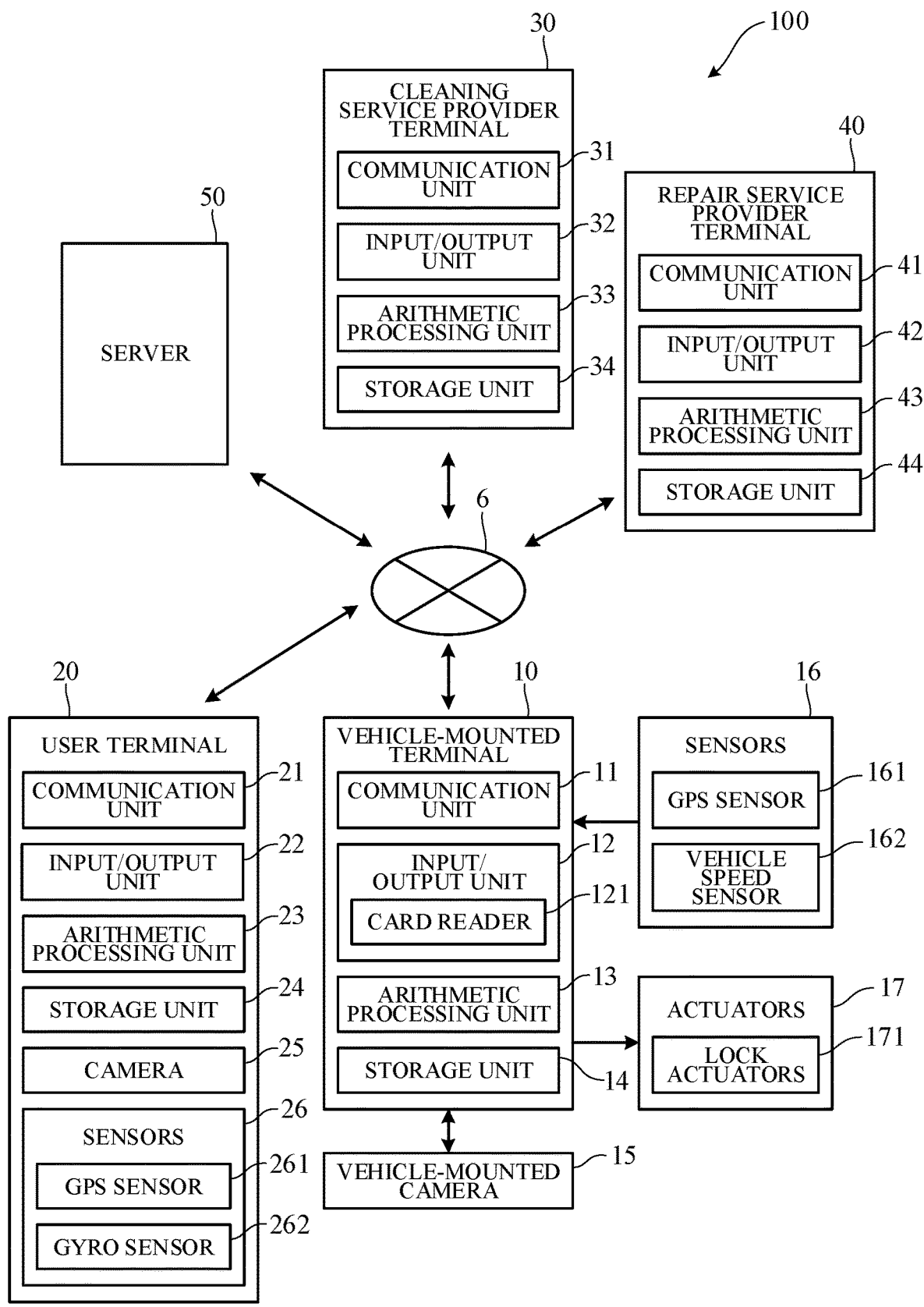
FIG. 2 is a block diagram showing a configuration of main components of the vehicle state evaluation system having the vehicle state evaluation apparatus according to the embodiment of the present invention.

FIG. 2 is a block diagram showing the configuration of main components of the vehicle state evaluation system 100.

Figure 3:
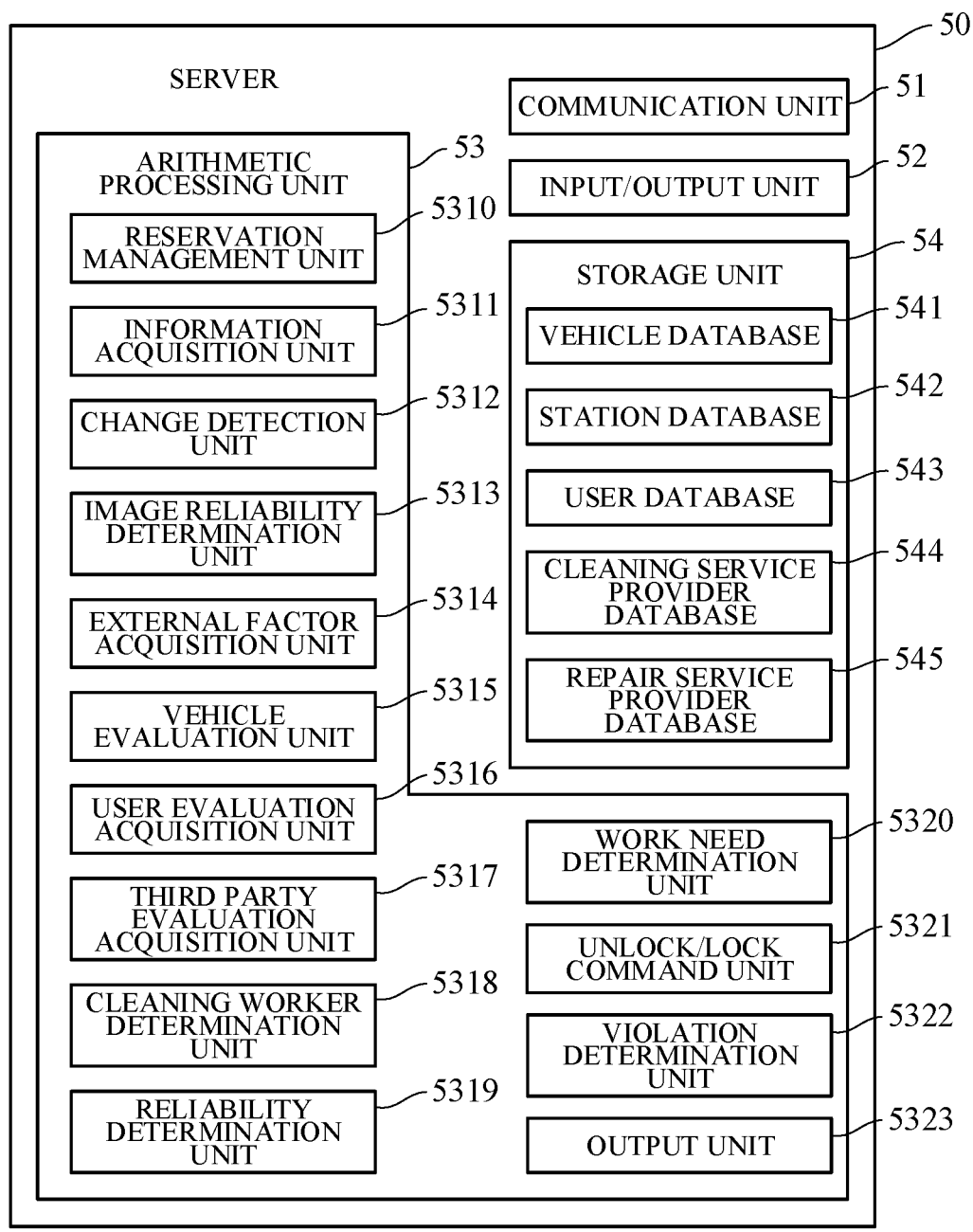
FIG. 3 is a block diagram showing a configuration of main components of the server of FIG. 2.

FIG. 3 is a block diagram showing the configuration of main components of the server 50 in FIG. 2. As shown in FIG. 2, the vehicle state evaluation system 100 includes a vehicle-mounted terminal 10, a user terminal 20, a cleaning service provider terminal 30 owned by a cleaning service provider that cleans a vehicle 1, a repair service provider terminal 40 owned by a repair service provider that repairs the vehicle 1, and the server 50.

The vehicle-mounted terminal 10, user terminal 20, cleaning service provider terminal 30, repair service provider terminal 40, and server 50 are connected to a communication network 6, such as a wireless communication network, the Internet, or telephone line network. While the single vehicle-mounted terminal 10, single user terminal 20, single cleaning service provider terminal 30, and single repair service provider terminal 40 are shown in FIG. 2 for convenience, multiple terminals 10, multiple terminals 20, multiple terminals 30, and multiple terminals 40 may be provided. While the single server 50 is shown in FIGS. 2 and 3, the functions of the server 50 shown in FIGS. 2 and 3 may be distributed to multiple servers. A part of the communication path may be wired rather than wireless.

For example, the vehicle-mounted terminal 10 includes a vehicle-mounted navigation system. The vehicle-mounted terminal 10 includes a communication unit 11, an input/output unit 12, an arithmetic processing unit 13, and a storage unit 14. Connected to the vehicle-mounted terminal 10 are a vehicle-mounted camera 15, sensors 16, and actuators 17.

The communication unit 11 is configured to be able to wirelessly communicate with the server 50 through the communication network 6. The communication unit 11 transmits some of signals from the vehicle-mounted camera 15 and sensors 16 to the server 50 along with a vehicle ID identifying the vehicle 1 every predetermined time.

The input/output unit 12 includes switches or buttons operable by the user, a microphone, a speaker, a monitor, and the like. In addition, the input/output unit 12 includes a card reader 121 that reads user information from the authentication card of the user. Used as the authentication card is, for example, a driver's license that incorporates an integrated circuit (IC) and stores personal information of the user. The card reader 121 is disposed in a predetermined position (e.g., under the rear window) of the vehicle 1 so that it can recognize the authentication card brought close to the card reader 121 from outside the vehicle.

The arithmetic processing unit 13 includes a CPU. The arithmetic processing unit 13 performs predetermined processing based on signals inputted through the input/output unit 12, signals detected by the sensors 16, signals received from outside the vehicle-mounted terminal 10 through the communication unit 11, data stored in the storage unit 14, and the like and outputs control signals to the actuators 17 in the vehicle 1, as well as to the input/output units 12 and the storage unit 14.

The arithmetic processing unit 13 also controls transmission and reception of signals between the vehicle-mounted terminal 10 and server 50 by outputting control signals to the communication unit 11. For example, when the user brings the authentication card close to the card reader 121 to start to use the vehicle 1, the arithmetic processing unit 13 controls the communication unit 11 so that user information read by the card reader 121 is transmitted to the server 50 through the communication unit 11. The server 50 determines whether there are reservation information corresponding to the received user information, renting images (to be discussed later), and the like. If there are corresponding reservation information, renting images, and the like, the server 50 transmits an unlock command to the arithmetic processing unit 13 of the vehicle-mounted terminal 10. On the other hand, if there is no corresponding reservation information, renting images, or the like, the server 50 transmits a lock command. If the arithmetic processing unit 13 receives an unlock command, it outputs an unlock command to lock actuators 171 (to be discussed later); if it receives a lock command, it outputs a lock command to the lock actuators 171.

The storage unit 14 includes a volatile memory or non-volatile memory (not shown). The storage unit 14 stores various types of programs executed by the arithmetic processing unit 13 and various types of data. For example, the storage unit 14 temporarily stores data detected by the sensors 16, image data captured by the vehicle-mounted camera 15, and the like. The stored data is processed by the arithmetic processing unit 13 and transmitted to the server 50 through the communication unit 11 every predetermined time.

The vehicle-mounted camera 15 is a camera including an image sensor, such as a CCD or CMOS, and is able to capture images of the interior of the vehicle 1. For example, a change in the state of the interior of the vehicle 1 between when renting the vehicle 1 and when returning it can be detected on the basis of image data of the interior captured by the vehicle-mounted camera 15. While the single vehicle-mounted camera 15 is shown in FIG. 2 for convenience, multiple vehicle-mounted cameras 15 may be provided. For example, a vehicle-mounted camera for capturing images of the driver's seat and passenger seat and a vehicle-mounted camera for capturing images of the rear seats may be mounted.

The sensors 16 includes various types of sensors that detect the state of the vehicle 1. As an example, the sensors 16 include a GPS sensor 161 that detects the location of the vehicle 1 by receiving signals from a GPS satellite and a vehicle speed sensor 162 that detects the vehicle speed. Although not shown, the sensors 16 also include an acceleration sensor that detects acceleration acting on the vehicle 1, a gyro sensor that detects the angular velocity, a travel distance sensor that detects the travel distance (the vehicle speed sensor 162 may serve also as a travel distance sensor), a remaining fuel detection sensor that detects the remaining amount of fuel, a remaining battery capacity detection sensor that detects the remaining battery capacity, a door open/close sensor that detects the open/close of the door, and the like.

The actuators 17 drive the devices mounted on the vehicle 1 in accordance with a command from the vehicle-mounted terminal 10 (arithmetic processing unit 13). As an example, the actuators 17 include the lock actuators 171 that unlock and lock door locks. When the arithmetic processing unit 13 outputs an unlock signal, the lock actuators 171 unlock the door locks; when the arithmetic processing unit 13 outputs a lock signal, the lock actuators 171 lock the door locks. Although not shown, the actuators 17 also include actuators for driving engine related devices, actuators for driving transmission related devices, actuators for driving brakes, actuators for steering, and the like.

The user terminal 20 consists of a personal computer, a mobile wireless terminal such as a smartphone, or the like operated by the user. The vehicle-mounted camera 15 mounted on the vehicle 1 can be used as a part of the user terminal 20 (as the camera 25). In this case, the vehicle-mounted camera 15 may be caused to always capture images of the interior of the vehicle 1 so that vehicle-interior images captured by the vehicle-mounted camera 15 immediately after the user starts to use the vehicle 1 and thus the vehicle-mounted terminal 10 starts, are used as renting images and vehicle-interior images captured by the vehicle-mounted camera 15 immediately before the user ends the use of the vehicle 1 and thus the vehicle-mounted terminal 10 stops, are used as returning images. The user terminal 20 includes a communication unit 21, an input/output unit 22, an arithmetic processing unit 23, a storage unit 24, a camera 25, and sensors 26.

The communication unit 21 is configured to be able to wirelessly communicate with the server 50 through the communication network 6. The communication unit 21 transmits a signal to request reservation, cancellation, or the like of the vehicle 1, still images or moving images captured by the camera 25, and location information, posture information, or the like of the user terminal detected by the sensors 26 to the server 50 along with an user ID for identifying the user. The images captured by the vehicle-mounted camera 15 are transmitted to the server 50 through the communication unit 11 of the vehicle-mounted terminal 10.

The input/output unit 22 includes, for example, a keyboard, a mouse, a monitor, a touchscreen, and the like. The user inputs user information through the input/output unit 22. The user information includes the address, name, contact information, and driver's license number of the user, information required for payment (e.g., credit card number), and the like. The user is allowed to use the vehicle 1 only after the user registers himself or herself as a member by inputting the user information.

To reserve the vehicle 1, the user inputs vehicle reservation information. For example, the user inputs the use date and time (use start date and time, and use end date and time) of the vehicle 1. The server 50 retrieves vehicles 1 that can be reserved at the specified use date and time and transmits information about the retrieved vehicles 1 and information about stations 2 to the user terminal 20.

The information about the retrieved vehicles 1 (vehicle information) and the information about the stations 2 (station information) are displayed on the input/output unit 22. When the user selects a desired vehicle 1 and station 2 from among the displayed vehicles 1 and stations 2 through the input/output unit 22 or when the user approves the displayed single vehicle 1 and station 2, the vehicle reservation is confirmed.

The arithmetic processing unit 23 includes a CPU. The arithmetic processing unit 23 performs predetermined processing based on signals inputted through the input/output unit 22, signals received from outside the user terminal 20 through the communication unit 21, images captured by the camera 25, location information and posture information of the user terminal detected by the sensors 26, and data stored in the storage unit 24 and outputs control signals to the communication unit 21, input/output unit 22, and storage unit 24. Thus, the user is able to change or confirm the reserved vehicle, or transmit the images of the vehicle 1, the location information and posture information of the user terminal 20 at the time when the images have been captured, and the like to the server 50, through the input/output unit 22 (monitor, etc.).

The storage unit 24 includes a volatile memory or non-volatile memory (not shown). The storage unit 34 stores various types of programs executed by the arithmetic processing unit 33 and various types of data.

The camera 25 is a camera including an image sensor, such as a CCD or CMOS, and is able to capture images of the vehicle 1. For example, a change in the state of the vehicle 1 between when renting the vehicle 1 and when returning it is detected on the basis of the images of the vehicle 1 taken by the user using the camera 25. The user takes images of the exterior of the vehicle 1 using the camera 25 and transmits the taken images to the server 50 through the communication unit 21. The server 50 determines the reliability of the received images. If it determines that the images are reliable, the server 50 evaluates the state of the vehicle 1 at the time when the vehicle 1 has been returned and the reliability of the user, who has used the vehicle 1. The configuration of the main components of the server 50 will be described later.

The sensors 26 includes various types of sensors that detect the state of the user terminal 20. As an example, the sensors 26 include a GPS sensor 261 that detects the location of the user terminal 20 by receiving signals from a GPS satellite and a gyro sensor 262 that detects the angular velocity of the user terminal 20. Although not shown, the sensors 26 also include a remaining battery capacity detection sensor that detects the remaining battery capacity, a radio-wave receiving sensor that detects the radio-wave reception situation, and the like. The server 50 determines whether, for example, the user has moved around the vehicle 1 by 360 degrees and taken images of at least the front, rear, left, and right sides of the vehicle 1, that is, the entire exterior of the vehicle 1, on the basis of the location information of the user terminal 20 detected by the GPS sensor 261 and the posture information of the user terminal 20 detected by the gyro sensor 262.

The cleaning service provider terminal 30 consists of a personal computer, a mobile wireless terminal such as smartphone, or the like operated by the cleaning service provider. The cleaning service provider terminal 30 includes a communication unit 31, an input/output unit 32, an arithmetic processing unit 33, and a storage unit 34.

The communication unit 31 is configured to be able to wirelessly communicate with the server 50 through the communication network 6. When it receives a signal to request cleaning of the vehicle 1 from the server 50, the communication unit 31 transmits a signal to accept this request, to the server 50 along with a cleaning service provider ID for identifying the cleaning service provider. When the cleaning of the vehicle 1 is completed, the communication unit 31 transmits a signal to report evaluation information of the state of the yet-to-be-cleaned vehicle 1 and the completion of the cleaning, to the server 50 along the cleaning service provider ID.

The input/output unit 32 includes, for example, a keyboard, a mouse, a monitor, touchscreen, and the like. The cleaning service provider inputs information indicating acceptance of the cleaning request of the vehicle 1, evaluation information of the state of the yet-to-be-cleaned vehicle 1, information about the completion of the cleaning, and the like through the input/output unit 32. Information about the cleaning service provider (cleaning service provider information) is previously registered in the car sharing service provider. The cleaning service provider information includes the address, name, contact information, registration year/month/day, and the like of the cleaning service provider.

The arithmetic processing unit 33 includes a CPU. The arithmetic processing unit 33 performs predetermined processing based on signals inputted through the input/output unit 32, signals received from outside the cleaning service provider terminal 30 through the communication unit 31, and data stored in the storage unit 34 and outputs control signals to the communication unit 31, input/output unit 32, and storage unit 34. Thus, the cleaning service provider is able to accept or confirm the cleaning request from the car sharing service provider through the input/output unit 32 (monitor, etc.).

The storage unit 34 includes a volatile memory or non-volatile memory (not shown). The storage unit 34 stores various types of programs executed by the arithmetic processing unit 33 and various types of data.

The repair service provider terminal 40 consists of a personal computer, a mobile wireless terminal such as a smartphone, or the like operated by the repair service provider. The repair service provider terminal 40 includes a communication unit 41, an input/output unit 42, an arithmetic processing unit 43, and a storage unit 44.

The communication unit 41 is configured to be able to wirelessly communicate with the server 50 through the communication network 6. When it receives a signal to request repair of the vehicle 1 from the server 50, the communication unit 41 transmits a signal to accept this request, to the server 50 along with a repair service provider ID for identifying the repair service provider. When the repair of the vehicle 1 is completed, the communication unit 41 transmits a signal to report the completion of the repair, to the server 50 along with the repair service provider ID.

The input/output unit 42 includes, for example, a keyboard, a mouse, a monitor, touchscreen, and the like. The repair service provider inputs information indicating acceptance of the repair request of the vehicle 1, information about the completion of the repair, and the like through the input/output unit 42. Information about the repair service provider (repair service provider information) is previously registered in the car sharing service provider. The repair service provider information includes the address, name, contact information, registration year/month/day, and the like of the repair service provider.

The arithmetic processing unit 43 includes a CPU. The arithmetic processing unit 43 performs predetermined processing based on signals inputted through the input/output unit 42, signals received from outside the repair service provider terminal 40 through the communication unit 41, and data stored in the second conversion circuit 44 and outputs control signals to the communication unit 41, input/output unit 42, and storage unit 44. Thus, the repair service provider is able to accept or confirm the repair request from the car sharing service provider through the input/output unit 42 (monitor, etc.).

The storage unit 44 includes a volatile memory or non-volatile memory (not shown). The storage unit 44 stores various types of programs executed by the arithmetic processing unit 43 and various types of data.

The server 50 is formed as, for example, the server of the car sharing service provider. The server 50 may be formed using virtual server functions on cloud computing. As shown in FIG. 3, the server 50 includes a communication unit 51, an input/output unit 52, an arithmetic processing unit 53, and a storage unit 54.

The communication unit 51 is configured to be able to wirelessly communicate with the vehicle-mounted terminal 10, user terminal 20, cleaning service provider terminal 30, and repair service provider terminal 40 through the communication network 6. The input/output unit 52 includes, for example, a keyboard, a mouse, a monitor, touchscreen, and the like. The arithmetic processing unit 53 includes a CPU. The arithmetic processing unit 53 performs predetermined processing based on signals inputted through the input/output unit 52, signals received from outside the server 50 through the communication unit 51, and data stored in the server 50 and outputs control signals to the input/output unit 52 and storage unit 54. The functional elements of the arithmetic processing unit 53 will be described later.

The storage unit 54 includes a volatile memory or non-volatile memory (not shown). The storage unit 54 stores various types of programs executed by the arithmetic processing unit 53 and various types of data. The storage unit 54 includes a vehicle database 541, a station database 542, a user database 543, a cleaning service provider database 544, and a repair service provider database 545 as functional elements.

The vehicle database 541 stores information about the multiple vehicles 1 used for car sharing service (vehicle information), that is, information indicating the vehicle states or vehicle characteristics, such as the types, model years, body numbers, vehicle numbers, travel distances, maintenance histories, and availability of the vehicles 1, and the use schedules of the vehicles 1. The use schedules include the time-series use results of the vehicles 1, the current and future time-series reservations, and the schedules of maintenance of the vehicles 1 performed between the reservations.

The station database 542 stores information about the stations 2 used for car sharing service, that is, the addresses of the stations 2 and information about the vehicles 1 parked at the stations 2.

The user database 543 stores user information, such as the user IDs, addresses, names, contact information, and driver's license numbers of the users, inputted through the user terminal 20 (input/output unit 22), information indicating the credibility of the users (credibility information), such as the vehicle 1 use histories, use fee payment statuses, accident histories, and traffic violation histories of the users, and information indicating the reliability of the users (reliability information), such as the vehicle 1 use manners of the users. That is, the user database 543 stores the user information, credibility information, and reliability information of the users in such a manner that these types of information are associated with the user IDs. For example, the credibility varies with the frequency or level of accident or traffic violation and becomes a higher value as the frequency or level of accident or traffic violation becomes lower. For example, the reliability becomes a higher value if the user shows good manners when using the vehicle 1 or if the user accurately reports when the user damages or dirties the vehicle 1.

The cleaning service provider database 544 stores cleaning service provider information, such as the cleaning service provider IDs, addresses, names, and contact information of previously registered cleaning service providers, and information indicating the credibility of the cleaning service providers (credibility information), such as the vehicles 1 cleaning histories (actual results) of the cleaning service providers. That is, the cleaning service provider database 544 stores the cleaning service provider information and credibility information of the cleaning service providers in such a manner that these types of information are associated with the cleaning service provider IDs.

The repair service provider database 545 stores repair service provider information, such as the repair service provider IDs, addresses, names, and contact information of previously registered repair service providers, and information indicating the credibility of the repair service providers (credibility information), such as the vehicle 1 repair histories (actual results) of the repair service providers. That is, the repair service provider database 545 stores the repair service provider information and credibility information of the repair service providers in such a manner that these types of information are associated with the repair service provider IDs.

The arithmetic processing unit 53 includes, as functional elements, a reservation management unit 5310, an information acquisition unit 5311, a change detection unit 5312, an image reliability determination unit 5313, an external factor acquisition unit 5314, a vehicle evaluation unit 5315, a user evaluation acquisition unit 5316, a third party evaluation acquisition unit 5317, a cleaning worker determination unit 5318, a reliability determination unit 5319, a work need determination unit 5320, an unlock/lock command unit 5321, a violation determination unit 5322, and an output unit 5323.

The reservation management unit 5310 accepts the reservation of the vehicle 1 inputted by the user through the user terminal 20 (input/output unit 22). For example, the reservation management unit 5310 receives information about reservable vehicles 1 matching the vehicle reservation information inputted by the user, such as the use date and time of the vehicle 1, through the communication unit 51. The reservation management unit 5310 then retrieves reservable vehicles 1 satisfying the conditions of the received vehicle reservation information and transmits information about the retrieved vehicles 1 and corresponding stations 2 to the user terminal 20. The reservation management unit 5310 then accepts a reservation of a selected or accepted vehicle 1.

The reservation management unit 5310 also makes current and future use schedules for each vehicle 1 and registers the use schedules in the vehicle database 541. More specifically, the reservation management unit 5310 makes use schedules of the vehicle 1 reserved by the user using the user terminal 20 (input/output unit 22) and registers them in the vehicle database 541. The use schedules includes the use start date/time and use end date/time of the reserved vehicle 1 and the schedule of periodical maintenance.

The information acquisition unit 5311 acquires images of the vehicle 1 that the user has used (image information), information indicating the location in which the images have been taken (location information), information indicating the posture of the user terminal 20 at the time when the images have been taken (posture information), and the like. Specifically, the information acquisition unit 5311 acquires the images (renting images and returning images) of the vehicle 1, information indicating the times at which the renting images and returning images have been taken (renting time information and returning time information, for example, information indicating the times at which the renting images and returning images have been transmitted) transmitted from the user terminal 20, as well as the location information and posture information of the user terminal 20 transmitted from the user terminal 20.

The change detection unit 5312 detects the degree of change in the state of the vehicle 1 between when renting the vehicle 1 and when returning it, by making a comparison between the renting images and returning images of the vehicle 1. For example, the change detection unit 5312 detects a change, such as damage or dirt, when returning the vehicle 1, which has not been present when renting the vehicle 1. To detect a change when returning the vehicle 1, there can be used a change detection technique using typical image processing. For example, the renting images and returning images are binarized, the difference between the binarized images is calculated, and a change when returning the vehicle 1 is detected from the ratio of the calculated difference.

For example, the change detection unit 5312 detects dirt of the vehicle 1 when returning it by making a comparison between the renting images and returning images of the vehicle 1 and detects the degrees of dirt as the degree of change in the state of the vehicle 1. As used herein, "the degrees of dirt" refers to the degrees of dirt of the vehicle 1 when returning it with respect to the degrees of dirt of the vehicle 1 when renting it. To detect the degrees of dirt of the vehicle 1, there can be used a method using typical image processing similar to that when detecting a change in the state of the vehicle 1. For example, the degrees of dirt is detected as a larger value as the area of dirt detected by image processing is larger.

The image reliability determination unit 5313 determines whether the renting images and returning images of the vehicle 1 are reliable, on the basis of the renting location information and returning location information of the vehicle 1, the renting time information and returning time information of the vehicle 1, and the information indicating the postures of the user terminal 20 at the times when the images have been taken. Specifically, the image reliability determination unit 5313 determines whether both the locations in which the images of the vehicle 1 have been taken are the station 2, which is the renting and returning location of the vehicle 1, as well as determines whether both the renting images and returning images include images of at least the front, rear, left, and right sides of the vehicle 1, preferably images of the entire exterior of the vehicle 1.

That is, the image reliability determination unit 5313 determines whether the respective differences between the renting location information and returning location information of the vehicle 1, and the location information of the station 2 of the vehicle 1 fall within a predetermined range. If the respective differences fall within the predetermined range, the image reliability determination unit 5313 determines that both the locations in which the images have been taken are the station 2 and the renting images and returning images are reliable. On the other hand, if these differences do not fall within the predetermined range, the image reliability determination unit 5313 determines that the locations in which the images have been taken are not the station 2 and the renting images and returning images are not reliable. In this case, a warning to request the user to take images of the vehicle 1 again is transmitted to the user terminal 20 through the communication unit 51.

The image reliability determination unit 5313 may determine whether the respective differences between the times at which the renting images and returning images have been transmitted, and the scheduled renting time and scheduled returning time in the vehicle reservation information fall within a predetermined range. If these differences fall within the predetermined range, the image reliability determination unit 5313 determines that the renting images and returning images are reliable. On the other hand, if these differences do not fall within the predetermined range, the image reliability determination unit 5313 determines that the renting images and returning images are not reliable. In this case, a warning to request the user to take images of the vehicle 1 again is transmitted to the user terminal 20 through the communication unit 51.

The image reliability determination unit 5313 also determines whether the renting images and returning images include images of at least the front, rear, left, and right sides of the vehicle 1, on the basis of the information indicating the postures of the user terminal 20 at the times when the renting images and returning images have been taken. That is, the image reliability determination unit 5313 determines whether the user terminal 20 has moved around the vehicle 1 by 360 degrees and captured images of the entire exterior of the vehicle 1 including at least the front, rear, left, and right sides of the vehicle 1 as shown in FIG. 1B. If it determines that the renting images and returning images include images of at least the front, rear, left, and right sides of the vehicle 1, the image reliability determination unit 5313 determines that the renting images and returning images are reliable. On the other hand, if it determines that the renting images and returning images do not include images of at least the front, rear, left, and right sides of the vehicle 1, the image reliability determination unit 5313 determines that the renting images and returning images are not reliable. In this case, a warning to request the user to take images of the vehicle 1 again is transmitted to the user terminal 20 through the communication unit 51.

If the image reliability determination unit 5313 determines that the renting images and returning images are reliable, the change detection unit 5312 detects the degrees of dirt, which is a change in the state of the vehicle 1 between when renting the vehicle 1 and when returning it by making a comparison between the renting images and returning images of the vehicle 1.

The external factor acquisition unit 5314 acquires information about an external factor that dirties the vehicle 1. For example, if, during use of the vehicle 1, the user go to the sea or mountain or it snows or rains, the vehicle 1 is more likely to be dirtied due to a factor other than a fault of the user. For this reason, the external factor acquisition unit 5314 acquires travel information (travel track) of the vehicle 1 detected by the GPS sensor 161 of the vehicle-mounted terminal 10 or weather information through the communication unit 51 and determines whether there has been an external factor. If the external factor acquisition unit 5314 acquires an external factor, the change detection unit 5312 calculates a change except for a change caused by the external factor. Specifically, the change detection unit 5312 calculates the degrees of dirt except for the degrees of dirt caused by the external factor, that is, corrects the degrees of dirt.

The vehicle evaluation unit 5315 evaluates the state of the vehicle 1 on the basis of the degrees of dirt detected by the change detection unit 5312. An example of state evaluations of vehicles 1 made by the vehicle evaluation unit 5315 will be described with reference to FIGS. 4A and 4B. FIG. 4A is a diagram showing an example of state evaluations of vehicles 1 (1A to 1E) based on the degrees of dirt detected by the change detection unit 5312. FIG. 4B is a diagram showing an example of criteria by which the state evaluations of the vehicles 1 (1A to 1E) shown in FIG. 4A were made.

In the case of the vehicle 1A shown in FIG. 4A, the degrees of dirt detected by the change detection unit 5312 is 10%. If the external factor acquisition unit 5314 determines that there has been no external factor, the degrees of dirt of the vehicle 1A is confirmed to be 10% as it is without having to exclude the degrees of dirt caused by an external factor. In this case, the vehicle evaluation unit 5315 determines that the vehicle evaluation (images) is good. On the other hand, if the external factor acquisition unit 5314 determines that there has been an external factor, the change detection unit 5312 calculates the degrees of dirt except for the degrees of dirt caused by the external factor. For example, if the external factor acquisition unit 5314 determines that there has been an external factor, the change detection unit 5312 corrects the detected degrees of dirt by multiplying the degrees of dirt by 0.7. In this case, the degrees of dirt of the vehicle 1A becomes 7%, and the vehicle evaluation unit 5315 determines that the vehicle evaluation (images) is "good".

In the case of the vehicle 1B, the degrees of dirt detected by the change detection unit 5312 is 25%. If the external factor acquisition unit 5314 determines that there has been no external factor, the degrees of dirt of the vehicle 1B is confirmed to be 25% as it is. In this case, the vehicle evaluation unit 5315 determines that the vehicle evaluation (images) is "somewhat good". On the other hand, if the external factor acquisition unit 5314 determines that there has been an external factor, the degrees of dirt of the vehicle 1B is 17% and the vehicle evaluation unit 5315 determines that the vehicle evaluation (images) is "somewhat good".

In the case of the vehicle 1C, the degrees of dirt detected by the change detection unit 5312 is 40%. If the external factor acquisition unit 5314 determines that there has been no external factor, the degrees of dirt of the vehicle 1C is confirmed to be 40% as it is. In this case, the vehicle evaluation unit 5315 determines that the vehicle evaluation (images) is "somewhat bad". On the other hand, if the external factor acquisition unit 5314 determines that there has been an external factor, the degrees of dirt of the vehicle 1C becomes 28% and the vehicle evaluation unit 5315 determines that the vehicle evaluation (images) is "somewhat good".

In the case of the vehicle 1D, the degrees of dirt detected by the change detection unit 5312 is 70%. If the external factor acquisition unit 5314 determines that there has been no external factor, the degrees of dirt of the vehicle 1D is confirmed to be 70% as it is. In this case, the vehicle evaluation unit 5315 determines that the vehicle evaluation (images) is "bad". On the other hand, if the external factor acquisition unit 5314 determines that there has been an external factor, the degrees of dirt of the vehicle 1D becomes 49% and the vehicle evaluation unit 5315 determines that the vehicle evaluation (images) is "somewhat bad".

In the case of the vehicle 1E, the degrees of dirt detected by the change detection unit 5312 is 90%. If the external factor acquisition unit 5314 determines that there has been no external factor, the degrees of dirt of the vehicle 1E is confirmed to be 90% as it is. In this case, the vehicle evaluation unit 5315 determines that the vehicle evaluation (images) is "bad". On the other hand, if the external factor acquisition unit 5314 determines that there has been an external factor, the degrees of dirt of the vehicle 1E becomes 63% and the vehicle evaluation unit 5315 determines that the vehicle evaluation (images) is "bad".

As shown in FIG. 4B, the vehicle evaluation unit 5315 determines that the vehicle evaluation (images) is "good" when the degrees of dirt is 0 to 10%, determines that the vehicle evaluation (images) is "somewhat good" when the degrees of dirt is 11 to 30%, determines that the vehicle evaluation (images) is "somewhat bad" when the degrees of dirt is 31 to 50%, and determines that the vehicle evaluation (images) is "bad" when the degrees of dirt is 51 to 100%. These evaluation criteria are only illustrative, and the evaluation criteria used by the vehicle evaluation unit 5315 are not limited thereto.

The user evaluation acquisition unit 5316 acquires information about the state evaluation of the vehicle 1 inputted by the user through the user terminal 20 (input/output unit 22). That is, the user evaluation acquisition unit 5316 receives information about the evaluation of the degrees of dirt of the vehicle 1 based on the personal point of view of the user through the communication unit 51. For example, the user may evaluate the degrees of dirt of the vehicle 1 from his or her personal point of view on the basis of the evaluation criteria shown in FIG. 4B, as is done by the vehicle evaluation unit 5315.

The third party evaluation acquisition unit 5317 acquires information about a state evaluation of the vehicle 1 inputted by a third party different from the present user through the terminal of the third party. For example, the third party can be a cleaning worker of the cleaning service provider who periodically cleans the vehicle 1 parked in the station 2, or the next user of the vehicle 1. For example, the third party evaluation acquisition unit 5317 receives information about a state evaluation of the vehicle 1 inputted by the cleaning worker through the cleaning service provider terminal 30 (input/output unit 32). That is, the third party evaluation acquisition unit 5317 receives information about the evaluation of the degrees of dirt of the vehicle 1 based on the personal point of view of the cleaning worker through the communication unit 51. The cleaning worker may evaluate the degrees of dirt of the vehicle 1 from his or her personal point of view on the basis of the evaluation criteria shown in FIG. 4B, as is done by the vehicle evaluation unit 5315.

Or, the third party evaluation acquisition unit 5317 acquires information about a state evaluation of the vehicle 1 inputted by the next user of the vehicle 1 through the user terminal 20 (input/output unit 22) of the next user. That is, the third party evaluation acquisition unit 5317 receives information about the evaluation of the degrees of dirt of the vehicle 1 from the personal point of view of the next user through the communication unit 51. The next user may evaluate the degrees of dirt of the vehicle 1 from his or her personal point of view on the basis of the evaluation criteria shown in FIG. 4B, as is done by the vehicle evaluation unit 5315.

The cleaning worker determination unit 5318 determines whether the third party who has inputted the state evaluation of the vehicle 1 received by the third party evaluation acquisition unit 5317 is a cleaning worker of the cleaning service provider. The cleaning worker determination unit 5318 can made this determination on the basis of, for example, the cleaning service provider ID.

The reliability determination unit 5319 determines the user reliability including the vehicle 1 use manners of the user on the basis of the degrees of dirt detected by the change detection unit 5312 and the user evaluation acquired by the user evaluation acquisition unit 5316. In other words, the reliability determination unit 5319 determines the user reliability on the basis of the vehicle evaluation (images) made by the vehicle evaluation unit 5315 and the user evaluation acquired by the user evaluation acquisition unit 5316. The reliability determination unit 5319 may determine the user reliability on the basis of the evaluation of the degrees of dirt of the vehicle 1 from the personal point of view of the third party (e.g., a cleaning worker) acquired by the third party evaluation acquisition unit 5317 (third party evaluation).

If the evaluation of the degrees of dirt of the vehicle 1 from the personal point of view of the third party acquired by the third party evaluation acquisition unit 5317 is an evaluation made by a cleaning worker, that is, if the cleaning worker determination unit 5318 determines that the third party is a cleaning worker, the reliability determination unit 5319 determines the user reliability by weighting this third party evaluation. On the other hand, if the cleaning worker determination unit 5318 determines that the third party is not a cleaning worker, for example, if it determines that the third party is the next user, the reliability determination unit 5319 does not weight this third party evaluation. Even if the cleaning worker determination unit 5318 determines that the third party is a cleaning worker, if a predetermined time has elapsed since the return of the vehicle 1, the reliability determination unit 5319 does not weight this third party evaluation.

An example of determinations of the user reliability including the vehicle 1 use manners of the user made by the reliability determination unit 5319 will be described below with reference to FIG. 5. FIG. 5 is a diagram showing an example of the user reliability determined by the reliability determination unit 5319 of the server 50 in FIG. 2.

In the case of the vehicle 1A shown in FIG. 5, the vehicle evaluation (images) made by the vehicle evaluation unit 5315 is "good", the evaluation of the degrees of dirt made by the user (user evaluation) acquired by the user evaluation acquisition unit 5316 is "good", and the evaluation of the degrees of dirt made by the third party (third party evaluation) acquired by the third party evaluation acquisition unit 5317 is "good". In this case, the reliability determination unit 5319 determines that the user reliability including the vehicle 1A use manners of the user is "good". If the third party is a cleaning worker, the third party evaluation is weighted, but the user reliability remains "good" since the third party evaluation is "good".

In the case of the vehicle 1B, the vehicle evaluation (images) is "somewhat good", the user evaluation is "good", and the third party is "somewhat good". In this case, the reliability determination unit 5319 determines that the user reliability is "somewhat good". That is, although the user evaluation is higher than the vehicle evaluation (images) and third party evaluation and there are differences between the user evaluation, and the vehicle evaluation (images) and third party evaluation, the vehicle evaluation (images) and third party evaluation are "somewhat good" and therefore the user reliability becomes "somewhat good". If the third party is a cleaning worker, the third party evaluation is weighted, but the user reliability remains "somewhat good" since the third party evaluation is "somewhat good".

In the case of the vehicle 1C, the vehicle evaluation (images) is "somewhat good", the user evaluation is "somewhat bad", and the third party evaluation is "somewhat good". In this case, the reliability determination unit 5319 determines that the user reliability is "somewhat good". That is, although the user evaluation is lower than the vehicle evaluation (images) and third party evaluation and there are differences between the user evaluation, and the vehicle evaluation (images) and third party evaluation, the lower user evaluation seems to result from the humility of the user. Since the vehicle evaluation (images) and third party evaluation are "somewhat good", the user reliability becomes "somewhat good". If the third party is a cleaning worker, the third party evaluation is weighted, but the user reliability remains "somewhat good" since the third party evaluation is "somewhat good".

In the case of the vehicle 1D, the vehicle evaluation (images) is "somewhat bad", the user evaluation is "good", and the third party evaluation is "bad". In this case, the reliability determination unit 5319 determines that the user reliability is "bad". That is, the reason why there are differences between the user evaluation, and the vehicle evaluation (images) and third party evaluation although the vehicle evaluation (images) and third party evaluation are "somewhat bad" and "bad", respectively, seems that the user have not honestly reported the state of the vehicle 1, and therefore the reliability becomes "bad". If the third party is a cleaning worker, the third party evaluation is weighted, but the user reliability remains "bad" since the third party evaluation is "bad".

In the case of the vehicle 1E, the vehicle evaluation (images) is "bad", the user evaluation is "bad", and the third party evaluation is "bad". In this case, the reliability determination unit 5319 determines that the user reliability is "somewhat bad". That is, although the user has honestly reported the state of the vehicle 1, the vehicle evaluation (images) and third party evaluation are "bad" and therefore the reliability becomes "somewhat bad". If the third party is a cleaning worker, the third party evaluation is weighted, but the user reliability becomes "somewhat bad" since the honesty of the user is considered.

The work need determination unit 5320 determines whether there is a need to deploy a worker to the returning location (station 2) of the vehicle 1, on the basis of the degrees of dirt of the vehicle 1 detected by the change detection unit 5312. Specifically, the work need determination unit 5320 determines whether a worker who cleans the vehicle 1 (cleaning worker) or a worker who repairs the vehicle 1 (repair worker) should be deployed, on the basis of the degrees of dirt of the vehicle 1 detected by the change detection unit 5312.

If the degrees of dirt detected by the change detection unit 5312 is smaller than a first threshold, there seems to be no need for cleaning and therefore the work need determination unit 5320 determines that there is no need to deploy a worker. If the degrees of dirt is equal to or greater than the first threshold and smaller than a second threshold, there seems to be a need for cleaning and therefore the work need determination unit 5320 determines that there is a need to deploy a cleaning worker. If the degrees of dirt is equal to or greater than the second threshold, there is a great change in the state of the vehicle 1 between when renting the vehicle 1 and when repairing it and there seems to be a need for repair rather than cleaning. Accordingly, the work need determination unit 5320 determines that there is a need to deploy a repair worker.

If the image reliability determination unit 5313 determines that the renting images are reliable, the unlock/lock command unit 5321 transmits an unlock command to the vehicle 1. If the image reliability determination unit 5313 determines that the renting images and returning images are reliable, it transmits a lock command to the vehicle 1.

The violation determination unit 5322 determines whether the user of the vehicle 1 has committed a traffic violation, on the basis of signals acquired by the sensors 16 of the vehicle-mounted terminal 10. For example, the violation determination unit 5322 determines whether the user has committed a speeding violation, by identifying the current location of the vehicle 1 on the basis of signals from the GPS sensor 161 and determining which of the limit speed of the vehicle 1 at that location and a vehicle speed obtained from signals from the vehicle speed sensor 162 is higher. If it determines that the user has committed a speeding violation, the violation determination unit 5322 updates the credibility information by lowering the user credibility stored in the user database 543.

The output unit 5323 stores the state evaluation of the vehicle 1 made by the vehicle evaluation unit 5315 and the user reliability determined by the reliability determination unit 5319 in the user database 543, as well as transmits these types of information to the user terminal 20 through the communication unit 51. This allows the user to know the evaluation of the vehicle 1 use manners of the user based on the accurate evaluation of the state of the vehicle 1.

Figure 6A:
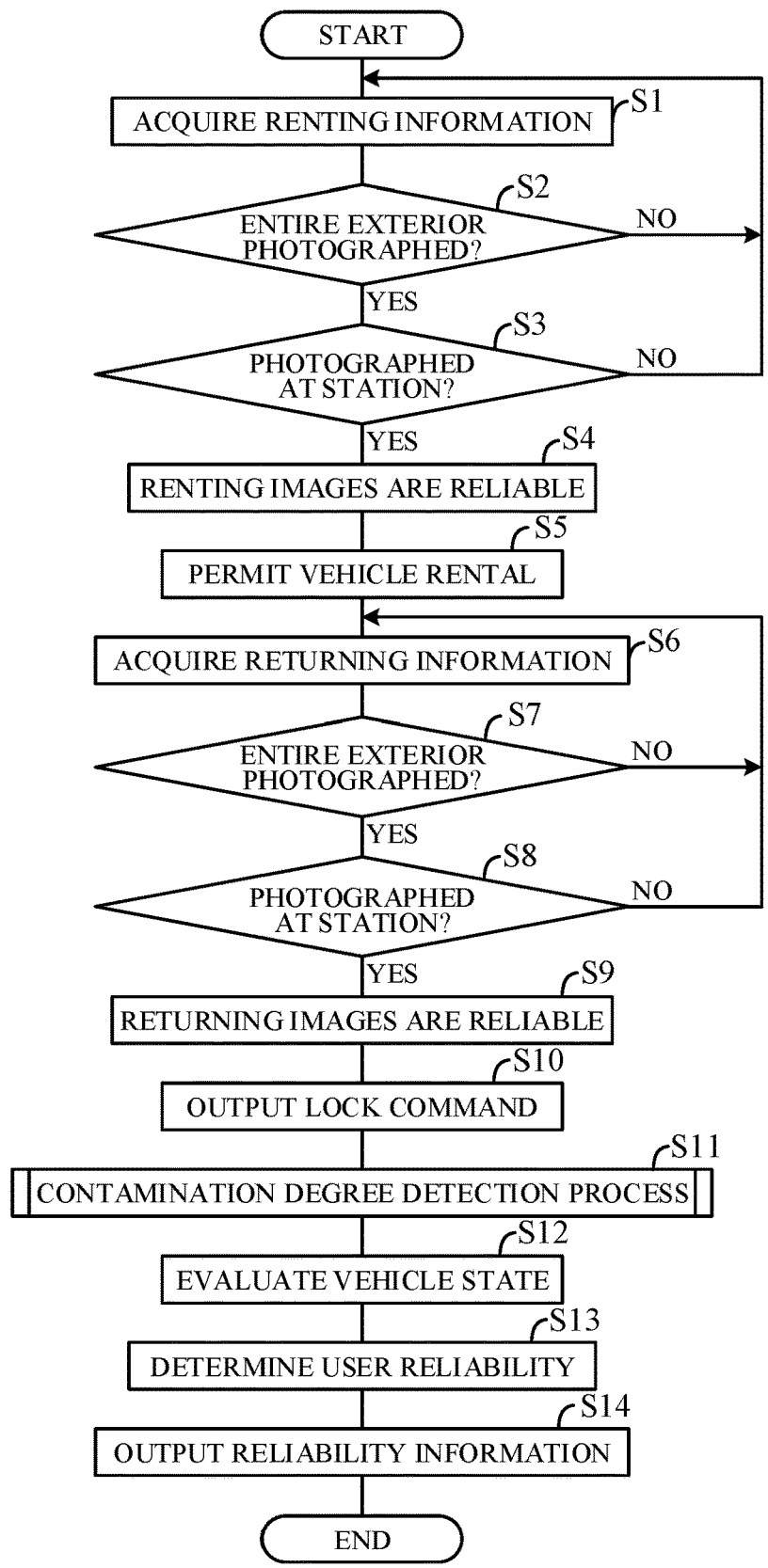
FIG. 6A is a flowchart showing an example of a reliability evaluation process including a vehicle evaluation process performed by an arithmetic processing unit of the server of FIG. 2.
Figure 6B:
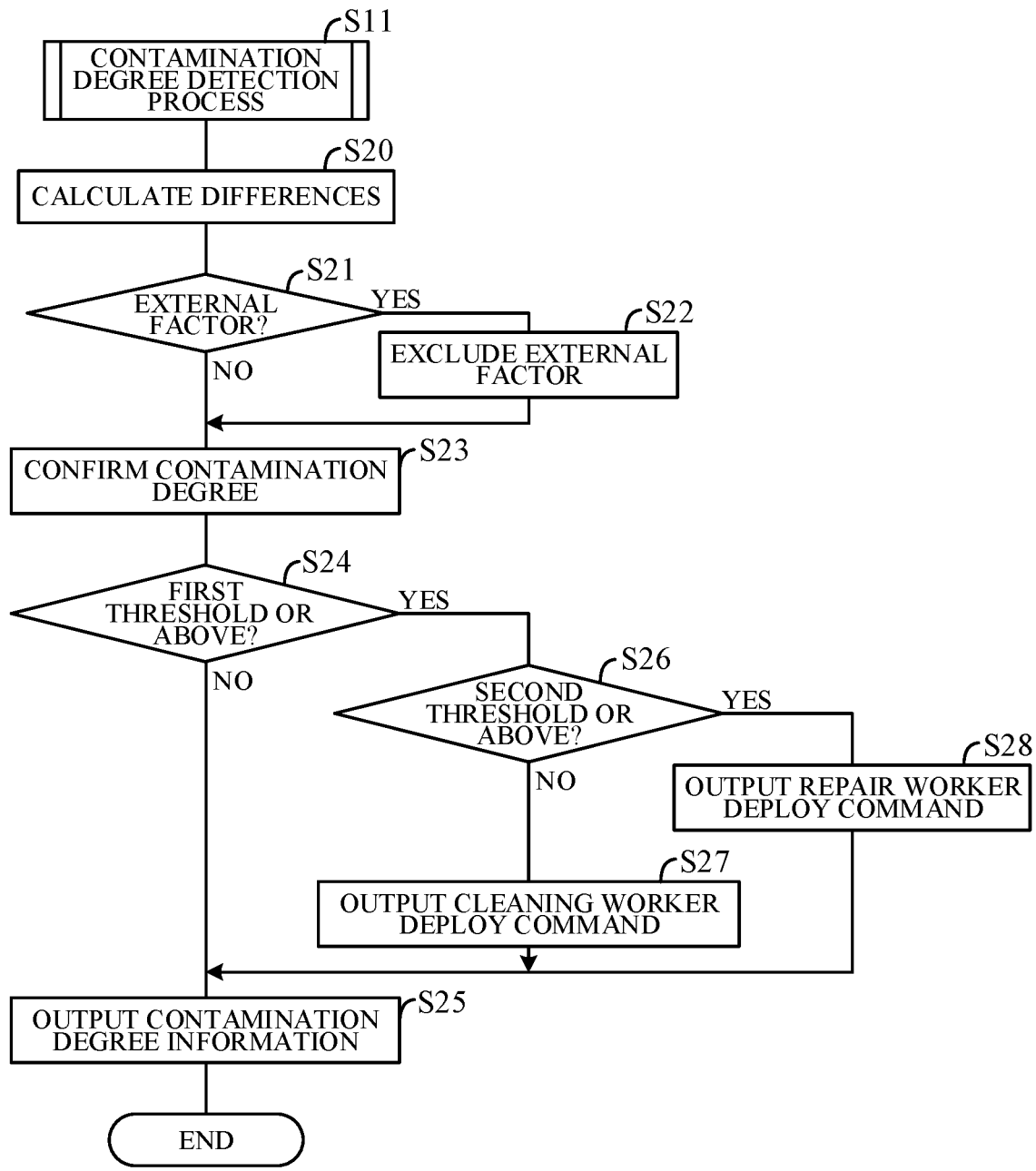
FIG. 6B is a flowchart showing an example of a dirt degree detection process performed by the arithmetic processing unit of the server of FIG. 2.

FIGS. 6A and 6B show an example of processes performed by the arithmetic processing unit 53 in accordance with a program previously stored in the storage unit 54 of the server 50. FIG. 6A is a flowchart showing an example of a reliability evaluation process including a vehicle evaluation process, and FIG. 6B is a flowchart showing an example of a dirt degree detection process. For example, the process shown in the flowchart in FIG. 6A is started when the server 50 receives user information read by the card reader 121 when the user starts to use the vehicle 1 and ended when it outputs information indicating the user reliability. The process shown in the flowchart of FIG. 6B is a part of the process shown in the flowchart of FIG. 6A.

First, in S1 (S means a process step), the renting images, renting location information, and renting time information of the vehicle 1 transmitted from the user terminal 20 are acquired. Then, in S2, it is determined whether the renting images transmitted from the user terminal 20 are images of the entire exterior of the vehicle 1. If the determination in S2 is NO, a predetermined warning is outputted to the user terminal 20 through the communication unit 51 and the process returns to S1; if the determination in S2 is YES, the process proceeds to S3. Then, in S3, it is determined whether the location in which the renting images have been taken is the station 2. If the determination in S3 is NO, a predetermined warning is outputted to the user terminal 20 through the communication unit 51 and the process returns to S1; if the determination in S2 is YES, the process proceeds to S4 and it is determined that the renting images are reliable. Then, in S5, a rental permission signal is outputted to the user terminal 20 through the communication unit 51, and an unlock command is transmitted to the vehicle-mounted terminal 10.

Then, in S6, the returning images, returning location information, and returning time information of the vehicle 1 transmitted from the user terminal 20 are acquired. Then, in S7, it is determined whether the returning images transmitted from the user terminal 20 are images of the entire exterior of the vehicle 1. If the detection in S7 is NO, a predetermined warning is outputted to the user terminal 20 through the communication unit 51 and the process returns to S6; if the determination in S2 is YES, the process proceeds to S8. Then, in S8, it is determined whether the location in which the returning images have been taken is the station 2. If the determination in S8 is NO, a predetermined warning is outputted to the user terminal 20 through the communication unit 51 and the process returns to S6; if the determination in S8 is YES, the process proceeds to S9 and it is determined that the returning images are reliable. Then, in S10, a lock command is transmitted to the vehicle-mounted terminal 10 through the communication unit 51.

Then, in S11, the degrees of dirt of the vehicle 1 is detected. The dirt degree detection process in S11 will be described later. Then, in S12, the state of the vehicle 1 is evaluated. Then, in S13, the user reliability is determined. Then, in S14, information about the user reliability is outputted to the user terminal 20, ending the process.

Next, the dirt degree detection process in S11 will be described. As shown in FIG. 6B, first, in S20, the difference between the renting images and returning images is calculated. Then, in S21, it is determined whether there is information about an external factor. If the determination in S21 is YES, the process proceeds to S22 to calculate the degrees of dirt except for the degrees of dirt caused by the external factor. In S23, the degrees of dirt is confirmed. On the other hand, if the determination in S21 is NO, the degrees of dirt is confirmed in S23 without having to exclude the degrees of dirt caused by an external factor.

Then, in S24, it is determined whether the degrees of dirt is equal to or greater than the first threshold. If the determination in S24 is NO, it is determined that there is no need to deploy a worker and the process proceeds to S25. Information about the degrees of dirt is outputted to the vehicle evaluation unit 5315, ending the process. On the other hand, if the determination in S24 is YES, it is determined that there is a need to deploy a worker who cleans the vehicle 1 or a worker who repairs it.

The process proceeds to S26 to determine whether the degrees of dirt is equal to or greater than the second threshold. If the determination in S26 is NO, it is determined that there is a need to deploy a cleaning worker. The process proceeds to S27 to output a command signal to deploy a cleaning worker, to the cleaning service provider terminal 30 through the communication unit 51. The process proceeds to S25 to output information about the degrees of dirt to the vehicle evaluation unit 5315. Thus, the process is completed.

On the other hand, if the determination in S26 is YES, it is determined that there is a need to deploy a repair worker. The process proceeds to S28 to output a command signal to deploy a repair worker, to the repair service provider terminal 40 through the communication unit 51. The process proceeds to S25 to output information about the degrees of dirt to the vehicle evaluation unit 5315. Thus, the process is completed.

The embodiment of the present invention is able to produce the following advantageous effects.

(1) The server 50 serving as a vehicle state evaluation apparatus includes the information acquisition unit 5311 that acquires, from the user terminal 20, the renting images of the vehicle 1 that the user of car sharing service has taken using the camera 25 mounted on the user terminal 20 when renting the vehicle 1, the renting location information indicating the location in which the renting images have been taken, the returning images of the vehicle 1 taken by the user when returning the vehicle 1, and the returning location information indicating the location in which the returning images have been taken, the change detection unit 5312 that detects the degree of change in the state (the degrees of dirt) of the vehicle 1 between when renting the vehicle 1 and when returning it on the basis of the renting images and returning images acquired by the information acquisition unit 5311, and the image reliability determination unit 5313 that determines whether the renting images and returning images are reliable, on the basis of the renting location information and returning location information acquired by the information acquisition unit 5311. If the image reliability determination unit 5313 determines that the renting images and returning images are reliable, the change detection unit 5312 detects the degrees of dirt of the vehicle 1 when returning it with respect to the degrees of dirt of the vehicle 1 when renting it.

This configuration allows for accurate evaluation of the state of the vehicle 1 that the user of car sharing service has used. For example, even if the user acquires images of the vehicle 1 somewhere else in advance and attempts to use these images as the returning images of the vehicle 1, the user cannot use such images since the information indicating the location in which those images have been taken differs from the station 2 of the vehicle 1. That is, the user cannot use fraudulent images as the returning images. This allows for accurate evaluation of the state of the vehicle 1 that the user has used. Also, evaluating the state of the vehicle 1 that the user has used, on the basis of the images taken by the user himself or herself allows the user to become aware of damage or dirt on the vehicle 1 and to improve his or her manners when using the vehicle 1.

(2) The image reliability determination unit 5313 determines whether the locations in which the renting images and returning images have been taken fall within a predetermined range from the station 2, which is the predetermined renting and returning location of the vehicle 1, on the basis of the renting location information and returning location information acquired by the information acquisition unit 5311. If it determines that the locations in which the renting images and returning images have been taken fall within the predetermined range, the image reliability determination unit 5313 determines that the renting images and returning images are reliable; if it determines that the locations do not fall within the predetermined range, the image reliability determination unit 5313 determines that the renting images and returning images are not reliable. This makes it easy to determine whether both the locations in which the renting images and returning images have been taken are the station 2, thereby making it easy to determine whether the renting images and returning images are reliable.

(3) The information acquisition unit 5311 also acquires the posture information of the user terminal 20. The image reliability determination unit 5313 also determines whether the renting images and returning images acquired by the information acquisition unit 5311 include images of at least the front, rear, left, and right sides of the vehicle 1, on the basis of the location information and posture information of the user terminal 20 acquired by the information acquisition unit 5311. If it determines that the renting images and returning images include images of at least the front, rear, left, and right sides of the vehicle 1, the image reliability determination unit 5313 determines that the renting images and returning images are reliable. On the other hand, if it determines that the renting images and returning images do not include images of at least the front, rear, left, and right sides of the vehicle 1, the image reliability determination unit 5313 determines that the renting images and returning images are not reliable. This makes it possible to require the user to take images of at least the front, rear, left, and right sides of the vehicle 1, preferably, images of the entire exterior of the vehicle 1, thereby making it possible to accurately evaluate the state of the vehicle 1 that the user has used.

(4) The server 50 also includes the unlock/lock command unit 5321 that if the image reliability determination unit 5313 determines that the renting images and returning images are reliable, transmits a command to lock or unlock the vehicle 1. Thus, the determination whether the vehicle 1 should be locked or unlocked is associated with the determination whether the images are reliable. For example, this configuration allows for omission of user authentication that uses an IC driver's license or the like, realizing user-friendly service. Also, this configuration is able to cause the user to surely check the vehicle 1 before and after using it, as well as to favorably prevent the user from forgetting to lock the vehicle 1 or take images thereof.

(5) The server 50 also includes the work need determination unit 5320 that determines whether there is a need to deploy a worker to the returning location of the vehicle 1, on the basis of the degrees of dirt detected by the change detection unit 5312. This configuration allows the determination whether there is a need to deploy a worker to be made quickly and accurately, allowing for efficient use of the vehicle 1.

(6) If it determines that there is a need to deploy a worker, the work need determination unit 5320 determines whether a worker who cleans the vehicle 1 (cleaning worker) or a worker who repairs the vehicle 1 (repair worker) should be deployed, on the basis of the degrees of dirt detected by the change detection unit 5312. This configuration allows the determination whether a cleaning worker or repair worker should be deployed to be made quickly and accurately, allowing the vehicle 1 to be efficiently cleaned or repaired.

While, in the above embodiment, the user terminal 20 is used as a wireless terminal and the state of the vehicle 1 is evaluated by taking images of the exterior of the vehicle 1 using the user terminal 20, the wireless terminal is not limited to the user terminal 20. For example, the wireless terminal may be a camera-equipped terminal connected to a communication network, such as a camera-equipped terminal disposed in a station or the vehicle-mounted terminal 10 having the vehicle-mounted camera 15 mounted thereon. A state of the vehicle 1 whose images are to be taken is not limited to the exterior of the vehicle 1 and may be, for example, the interior of the vehicle 1, or both the exterior and interior of the vehicle 1. For example, the state of the vehicle 1 may be evaluated by using the vehicle-mounted terminal 10 as the wireless terminal and taking images of the interior of the vehicle 1 using the vehicle-mounted camera 15. Also, the state of the vehicle 1 may be evaluated by taking images of the interior of the vehicle 1 using the user terminal 20. Also, the state of the vehicle 1 may be evaluated by taking images of both the interior and exterior of the vehicle 1 using the user terminal 20.

While, in the above embodiment, the change detection unit 5312 detects the degrees of dirt of the vehicle 1 as a degree of change in the state of the vehicle 1 between the renting time and returning time, it may detect a degree of change in the state of the vehicle 1 otherwise. For example, the change detection unit 5312 may detect a degree of change in a state of the vehicle 1 including damage and dirt on the vehicle 1. While, in the above embodiment, the work need determination unit 5320 detects the degrees of dirt in accordance with the area of dirt and determines whether a cleaning worker or repair worker should be deployed, on the basis of the degrees of dirt, the work need determination unit 5320 may be configured otherwise. For example, the work need determination unit 5320 may be configured to detect the degree of change in the state of the vehicle in accordance with an area of damage or a damaged portion and to determine whether a cleaning worker or repair worker should be deployed, on the basis of the degree of change.

While, in the above embodiment, the example in which the vehicle state evaluation apparatus of the present invention is applied to car sharing has been described, it can also be applied to car rental.

The above embodiment can be combined as desired with one or more of the above modifications. The modifications can also be combined with one another.

According to the present invention, it becomes possible to properly evaluate vehicle state after use by a user of the vehicle renting service.

Above, while the present invention has been described with reference to the preferred embodiments thereof, it will be understood, by those skilled in the art, that various changes and modifications may be made thereto without departing from the scope of the appended claims.

What is claimed is:

1. A vehicle state evaluation apparatus, comprising:
an electronic control unit having a microprocessor and a memory connected to the microprocessor, wherein
the microprocessor is configured to perform:
  acquiring a renting image of a vehicle photographed by a user of a vehicle renting service using a camera mounted on a wireless terminal at a renting time of the vehicle and renting location information of a photographing location of the renting image, and a returning image of the vehicle photographed by the user using the camera at a returning time of the vehicle and returning location information of a photographing location of the returning image, from the wireless terminal;
  detecting a change degree of a state of the vehicle from the renting time to the returning time based on the renting image and the returning image acquired; and
  determining whether the renting image and the returning image are reliable based on the renting location information and the returning location information acquired, wherein
the microprocessor is configured to perform:
  the detecting including detecting the change degree when it is determined that the renting image and the returning image are reliable; and
  the determining whether the renting image and the returning image are reliable including determining whether the photographing location of the renting image and the returning image is within a predetermined range from a renting location and a returning location of the vehicle based on the renting location information and the returning location information acquired, and determining that the renting image and the returning image are reliable when it is determined that the photographing location is within the predetermined range, while determining that the renting image and the returning image are not reliable when it is determined that the photographing location is not within the predetermined range.

2. The vehicle state evaluation apparatus according to claim 1, wherein
the microprocessor is further configured to perform
  determining whether deployment of a worker for cleaning or repairing the vehicle to the returning location of the vehicle is needed based on the change degree detected.

3. The vehicle state evaluation apparatus according to claim 2, wherein
the microprocessor is configured to perform
  the determining whether deployment of the worker is needed including determining whether to deploy a worker for cleaning the vehicle or a worker for repairing the vehicle based on the change degree detected when it is determined that deployment of the worker is needed.

4. A vehicle state evaluation method, comprising:
acquiring a renting image of a vehicle photographed by a user of a vehicle renting service using a camera mounted on a wireless terminal at a renting time of the vehicle and renting location information of a photographing location of the renting image, and a returning image of the vehicle photographed by the user using the camera at a returning time of the vehicle and returning location information of a photographing location of the returning image, from the wireless terminal;
detecting a change degree of a state of the vehicle from the renting time to the returning time based on the renting image and the returning image acquired; and determining whether the renting image and the returning image are reliable based on the renting location information and the returning location information acquired, wherein the detecting includes detecting the change degree when it is determined that the renting image and the returning image are reliable, wherein the determining whether the renting image and the returning image are reliable includes determining whether the photographing location of the renting image and the returning image is within a predetermined range from a renting location and a returning location of the vehicle based on the renting location information and the returning location information acquired, and determining that the renting image and the returning image are reliable when it is determined that the photographing location is within the predetermined range, while determining that the renting image and the returning image are not reliable when it is determined that the photographing location is not within the predetermined range.

5. The vehicle state evaluation method according to claim 4, further comprising determining whether deployment of a worker for cleaning or repairing the vehicle to the returning location of the vehicle is needed based on the change degree detected.

6. The vehicle state evaluation method according to claim 5, wherein the determining whether deployment of the worker is needed includes determining whether to deploy a worker for cleaning the vehicle or a worker for repairing the vehicle based on the change degree detected when it is determined that deployment of the worker is needed.

7. A vehicle state evaluation apparatus, comprising:

an electronic control unit having a microprocessor and a memory connected to the microprocessor, wherein the microprocessor is configured to perform:
acquiring a renting image of a vehicle photographed by a user of a vehicle renting service using a camera mounted on a wireless terminal at a renting time of the vehicle and renting location information of a photographing location of the renting image, and a returning image of the vehicle photographed by the user using the camera at a returning time of the vehicle and returning location information of a photographing location of the returning image, from the wireless terminal;

detecting a change degree of a state of the vehicle from the renting time to the returning time based on the renting image and the returning image acquired; and determining whether the renting image and the returning image are reliable based on the renting location information and the returning location information acquired, wherein the microprocessor is configured to perform:
the detecting including detecting the change degree when it is determined that the renting image and the returning image are reliable;

the acquiring including acquiring posture information of the wireless terminal; and the determining whether the renting image and the returning image are reliable including determining whether the renting image and the returning image acquired include a front-side image, a rear-side image, a left-side image and a right-side image of the vehicle based on the renting location information, the returning location information and the posture information acquired, and determining that the renting image and the returning image are reliable when it is determined that the renting image and the returning image include the front-side image, the rear-side image, the left-side image and the right-side image of the vehicle, while determining that the renting image and the returning image are not reliable when it is determined that the renting image and the returning image do not include the front-side image, the rear-side image, the left-side image and the right-side image of the vehicle.

8. The vehicle state evaluation apparatus according to claim 7, wherein the microprocessor is further configured to perform:
determining whether deployment of a worker for cleaning or repairing the vehicle to the returning location of the vehicle is needed based on the change degree detected.

9. The vehicle state evaluation apparatus according to claim 8, wherein the microprocessor is configured to perform:
the determining whether deployment of the worker is needed including determining whether to deploy a worker for cleaning the vehicle or a worker for repairing the vehicle based on the change degree detected when it is determined that deployment of the worker is needed.

10. A vehicle state evaluation method, comprising:

acquiring a renting image of a vehicle photographed by a user of a vehicle renting service using a camera mounted on a wireless terminal at a renting time of the vehicle and renting location information of a photographing location of the renting image, and a returning image of the vehicle photographed by the user using the camera at a returning time of the vehicle and returning location information of a photographing location of the returning image, from the wireless terminal;

detecting a change degree of a state of the vehicle from the renting time to the returning time based on the renting image and the returning image acquired; and determining whether the renting image and the returning image are reliable based on the renting location information and the returning location information acquired, wherein the detecting includes detecting the change degree when it is determined that the renting image and the returning image are reliable, wherein the acquiring includes acquiring posture information of the wireless terminal, wherein the determining whether the renting image and the returning image are reliable includes determining whether the renting image and the returning image acquired include a front-side image, a rear-side image, a left-side image and a right-side image of the vehicle based on the renting location information, the returning location information and the posture information acquired, and determining that the renting image and the returning image are reliable when it is determined that the renting image and the returning image include the front-side image, the rear-side image, the left-side image and the right-side image of the vehicle, while determining that the renting image and the returning image are not reliable when it is determined that the renting image and the returning image do not include the front-side image, the rear-side image, the left-side image and the right-side image of the vehicle.

11. The vehicle state evaluation method according to claim 10, further comprising:
  determining whether deployment of a worker for cleaning or repairing the vehicle to the returning location of the vehicle is needed based on the change degree detected.

12. The vehicle state evaluation method according to claim 11, wherein
  the determining whether deployment of the worker is needed includes determining whether to deploy a worker for cleaning the vehicle or a worker for repairing the vehicle based on the change degree detected when it is determined that deployment of the worker is needed.

13. A vehicle state evaluation apparatus, comprising:
  an electronic control unit having a microprocessor and a memory connected to the microprocessor, wherein
  the microprocessor is configured to perform:
    acquiring a renting image of a vehicle photographed by a user of a vehicle renting service using a camera mounted on a wireless terminal at a renting time of the vehicle and renting location information of a photographing location of the renting image, and a returning image of the vehicle photographed by the user using the camera at a returning time of the vehicle and returning location information of a photographing location of the returning image, from the wireless terminal;
    detecting a change degree of a state of the vehicle from the renting time to the returning time based on the renting image and the returning image acquired;
    determining whether the renting image and the returning image are reliable based on the renting location information and the returning location information acquired; and
    outputting an unlock command or a lock command of the vehicle when it is determined that the renting image and the returning image are reliable, wherein
  the microprocessor is configured to perform:
    the detecting including detecting the change degree when it is determined that the renting image and the returning image are reliable.

14. The vehicle state evaluation apparatus according to claim 13, wherein
  the microprocessor is further configured to perform
    determining whether deployment of a worker for cleaning or repairing the vehicle to the returning location of the vehicle is needed based on the change degree detected.

15. The vehicle state evaluation apparatus according to claim 14, wherein
  the microprocessor is configured to perform:
    the determining whether deployment of the worker is needed including determining whether to deploy a worker for cleaning the vehicle or a worker for repairing the vehicle based on the change degree detected when it is determined that deployment of the worker is needed.

16. A vehicle state evaluation method, comprising:
  acquiring a renting image of a vehicle photographed by a user of a vehicle renting service using a camera mounted on a wireless terminal at a renting time of the vehicle and renting location information of a photographing location of the renting image, and a returning image of the vehicle photographed by the user using the camera at a returning time of the vehicle and returning location information of a photographing location of the returning image, from the wireless terminal;
  detecting a change degree of a state of the vehicle from the renting time to the returning time based on the renting image and the returning image acquired;
  determining whether the renting image and the returning image are reliable based on the renting location information and the returning location information acquired; and
  outputting an unlock command or a lock command of the vehicle when it is determined that the renting image and the returning image are reliable, wherein
  the detecting includes detecting the change degree when it is determined that the renting image and the returning image are reliable.

17. The vehicle state evaluation method according to claim 16, further comprising:
  determining whether deployment of a worker for cleaning or repairing the vehicle to the returning location of the vehicle is needed based on the change degree detected.

18. The vehicle state evaluation method according to claim 17, wherein
  the determining whether deployment of the worker is needed includes determining whether to deploy a worker for cleaning the vehicle or a worker for repairing the vehicle based on the change degree detected when it is determined that deployment of the worker is needed.

* * * * *